United States Patent
Madej

(10) Patent No.: US 8,376,234 B2
(45) Date of Patent: Feb. 19, 2013

(54) METHOD OF AND READER FOR ELECTRO-OPTICALLY READING SYMBOLS ON CURVED SURFACES

(75) Inventor: Dariusz Madej, Shoreham, NY (US)

(73) Assignee: Symbol Technologies, Inc., Holtsville, NY (US)

(*) Notice: Subject to any disclaimer, the term of this patent is extended or adjusted under 35 U.S.C. 154(b) by 34 days.

(21) Appl. No.: 13/173,600

(22) Filed: Jun. 30, 2011

(65) Prior Publication Data

US 2013/0001311 A1  Jan. 3, 2013

(51) Int. Cl.
*G06K 7/10* (2006.01)
(52) U.S. Cl. .......... 235/462.27; 235/462.25; 235/462.16
(58) Field of Classification Search ............. 235/462.27, 235/462.25, 462.16
See application file for complete search history.

(56) References Cited

U.S. PATENT DOCUMENTS

| | | | |
|---|---|---|---|
| 5,304,786 A | 4/1994 | Pavlidis et al. | |
| 5,336,874 A | 8/1994 | Hasegawa | |
| 5,949,054 A * | 9/1999 | Karpen et al. | 235/462.25 |
| 6,073,847 A | 6/2000 | Reichenbach et al. | |
| 6,454,168 B1 | 9/2002 | Brandt et al. | |
| 6,672,511 B1 | 1/2004 | Shellhammer | |
| 7,044,382 B2 * | 5/2006 | Iwaguchi et al. | 235/462.16 |

OTHER PUBLICATIONS

International Search Report and Written Opinion for counterpart International Patent Application No. PCT/US2012/044186 issued on Oct. 5, 2012.

* cited by examiner

*Primary Examiner* — Kristy A Haupt
(74) *Attorney, Agent, or Firm* — Nong-Qiang Fan

(57) ABSTRACT

Symbols having symbologies with multi-unit, bar and space element, start and stop patterns on curved surfaces of objects, are electro-optically read by capturing light from a target symbol over a scan line, and by generating an electrical analog signal indicative of the captured light over the scan line. A controller digitizes the electrical analog signal into a digitized signal, decodes the digitized signal between the start and stop patterns into valid characters of the target symbol, identifies leading and trailing waveform portions of the analog signal indicative of the start and stop patterns, matches the identified leading and trailing waveform portions of the analog signal against known analog waveforms of the start and stop patterns of the target symbol, and verifies that a match has occurred when the matching between the leading and trailing waveform portions and the known analog waveforms exceeds a known threshold correlation.

15 Claims, 5 Drawing Sheets

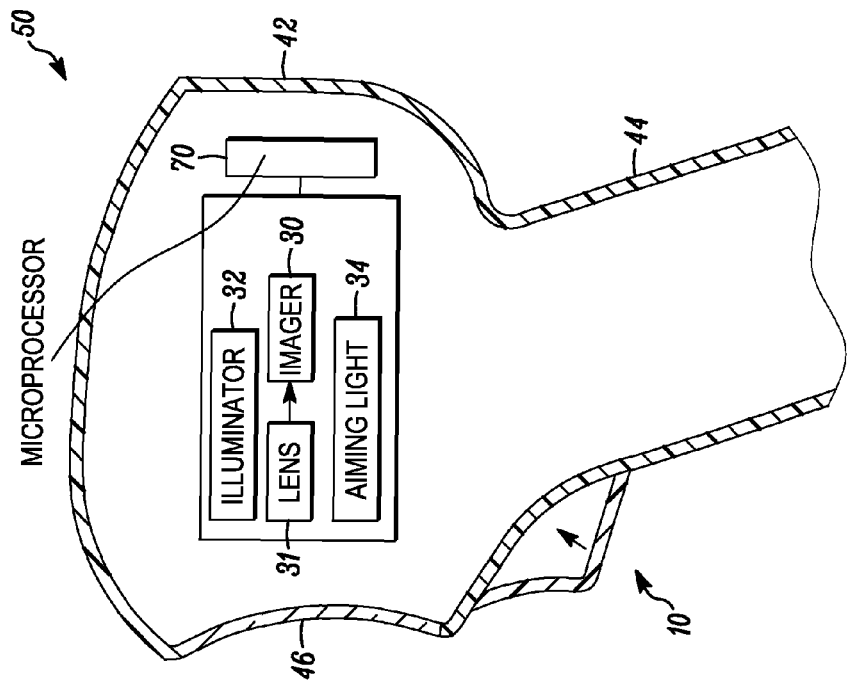
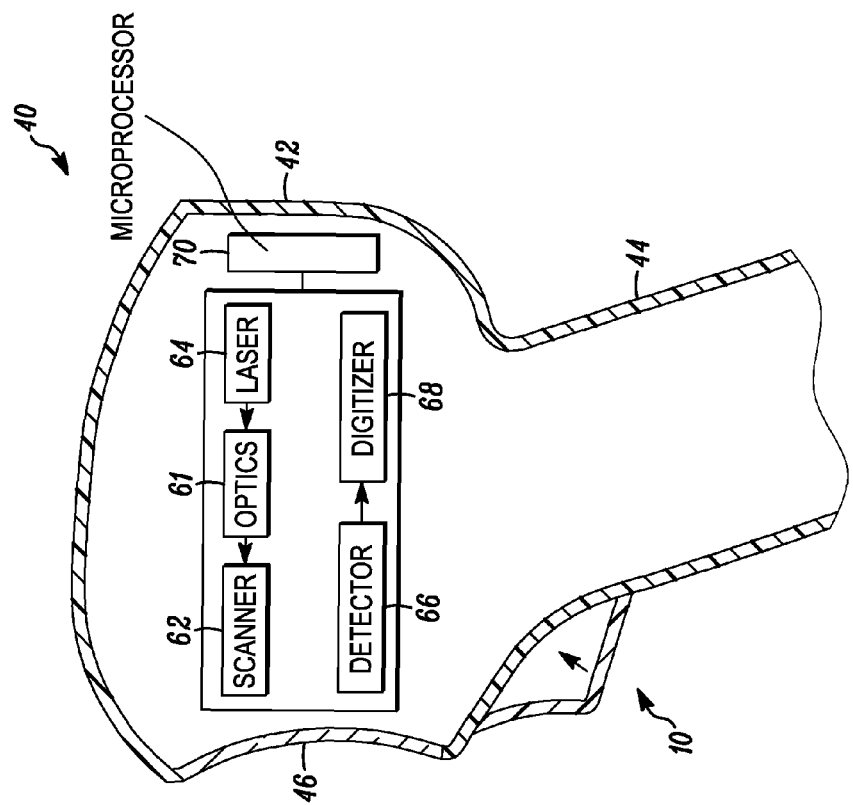

METHOD OF AND READER FOR ELECTRO-OPTICALLY READING SYMBOLS ON CURVED SURFACES

DESCRIPTION OF THE RELATED ART

Moving laser beam readers or laser scanners, as well as solid-state imaging systems or imaging readers, have both been used, in both handheld and hands-free modes of operation, to electro-optically read bar code symbols having different bar and space structures that are used to represent different characters. Sets of these structures are grouped together to form a symbology. There are many types of bar code symbologies, each having their own special characteristics and features. Most symbologies are designed to meet the needs of a specific application or industry.

For example, Code 128 is a very high-density, linear symbology used extensively in the shipping and packaging industries and encodes all 128 characters of ASCII, each character being composed of three bars and three spaces, each bar or space being 1, 2, 3, or 4 units wide, with a total of 11 units per character. Code 39 is a variable length, discrete, linear symbology for encoding characters, each character being composed of five bars and four spaces, each bar or space being 1, 2, or 3 units wide, with a total of 11-13 units per character. Code 93 is a variable length, discrete, linear symbology, primarily used by the Canadian Postal Service, for encoding characters of higher density than Code 39, each character being composed of three bars and three spaces, each bar or space being 1, 2, 3, or 4 units wide, with a total of 9 units per character. Portable Data File 417 (PDF417), as described in U.S. Pat. No. 5,304,786, is a stacked linear symbology used in a variety of applications, e.g., inventory management, transport, identification cards, etc., and having multiple rows of codewords, each codeword being composed of four bars and four spaces, each codeword being 17 units wide. Each of the above symbologies has start and stop patterns at its opposite end regions, each start and stop pattern being composed of many units, e.g., more than six units long. A unit, also known as a module, is the smallest or narrowest width of a bar or space element in the symbol.

The moving laser beam reader generally includes a laser for emitting a laser beam, a focusing lens assembly for focusing the laser beam to form a beam spot having a certain size at a focal plane in a range of working distances, a scan component for repetitively scanning the beam spot across a target symbol in a scan pattern, for example, a scan line, across the target symbol multiple times per second, e.g., forty times per second, a photodetector for detecting light reflected and/or scattered from the symbol and for converting the detected light into an analog electrical signal, and signal processing circuitry including a digitizer for digitizing the analog signal, and a microprocessor for decoding the digitized signal based upon the specific symbology used for the symbol.

The imaging reader includes a solid-state imager or sensor having an array of cells or photosensors, which correspond to image elements or pixels in a field of view of the imager, an illuminating light assembly for illuminating the field of view with illumination light from an illumination light source, e.g., one or more light emitting diodes (LEDs), and an imaging lens assembly for capturing return ambient and/or illumination light scattered and/or reflected from the symbol being imaged over a virtual scan pattern, e.g., a virtual scan line, over a range of working distances. Such an imager may include a one- or two-dimensional charge coupled device (CCD) or a complementary metal oxide semiconductor (CMOS) device and associated circuits for producing electronic analog signals corresponding to a one- or two-dimensional array of pixel information over the field of view. Again, signal processing circuitry including a microprocessor is used for digitizing the analog signal, and for decoding the digitized signal based upon the specific symbology used for the symbol. The microprocessor maps the virtual scan line over the symbol by energizing a row of the photosensors.

As advantageous as both types of readers are in reading symbols on generally flat surfaces of an object bearing or associated with the symbols, there are many applications where symbols are applied on irregular, non-flat, curved surfaces of the objects, such as being printed on a cylindrical food can, or on a cylindrical shipping tube. A relatively long symbol, especially of the types described above, applied on a curved surface may be subject to reading errors or be entirely unreadable, because its end regions at opposite ends of the scan line are distorted by the curvature of the object. The distortion causes the imaged bar and space elements at both ends of the scan line to be darker and more blurred, as compared to the imaged bar and space elements at the center of the scan line. The reader may not have enough resolution to read the distorted bar and space elements at the end regions of the symbol. By way of numerical example, if a Code 128 symbology having twenty-three characters, and a unit width of ten mils, is applied on a tube having a diameter of about 3⅛ inches, then the distorted bar or space element unit width at the ends of the scan line is about double that at the center of the scan line.

As described above, the multi-unit start and stop patterns, which are located at the opposite end regions of each symbol, are the most distorted by the curvature of the object, and are therefore the most likely to be subject to reading errors or entirely unreadable. Accordingly, it would be desirable to more reliably read such symbols on such non-flat, curved object surfaces.

SUMMARY OF THE INVENTION

One feature of this invention resides, briefly stated, in an arrangement for, and a method of, electro-optically reading symbols having symbologies with multi-unit, bar and space element, start and stop patterns on curved surfaces of objects. Such symbols include, but are not limited to, the Code 128, Code 39, Code 93 and PDF417 symbols discussed above. Such objects include the cylindrical food cans and cylindrical shipping tubes discussed above, but are not limited to such objects, and can include other curved objects, such as bottles of medicine, syringes, cylindrical machine parts marked with direct part marking (DPM) codes, etc.

A data capture assembly is provided for capturing light from a target symbol over a scan line, and for generating an electrical analog signal indicative of the captured light over the scan line. In one embodiment, the data capture assembly is part of a moving laser beam reader, which includes a laser for emitting a laser beam, a scanner for sweeping the laser beam along the scan line across the target symbol for reflection and scattering therefrom, and a detector for detecting the captured light from the target symbol. In another embodiment, the data capture assembly is part of an imaging reader, which advantageously includes an illuminator for illuminating the target symbol, and a solid-state imager, such as a charge coupled device (CCD) or a complementary metal oxide semiconductor (CMOS) device, for detecting the return illumination light from the target symbol along the scan line.

In accordance with this invention, a programmed microprocessor or controller is operative for digitizing the electrical analog signal into a digitized signal, for decoding the digitized signal between the start and stop patterns into valid characters of the target symbol, for identifying leading and trailing waveform portions or fragments of the analog signal indicative of the start and stop patterns, for matching the identified leading and trailing waveform portions of the analog signal against known analog waveforms of the start and stop patterns of the target symbol, and for verifying that a match has occurred when the matching between the leading and trailing waveform portions and the known analog waveforms exceeds a known threshold correlation, e.g., 50 percent.

Advantageously, the controller determines the symbology of the target symbol from the digitized signal, and thereupon, successively processes groups of k elements of the digitized signal, where k equals the number of bar and space elements in a single valid character of the determined symbology, and where the groups are separated by two bar and space elements. The controller then checks whether the successively processed groups are valid characters of the determined symbology without the start and stop patterns.

The method of electro-optically reading symbols having symbologies with multi-unit, bar and space element, start and stop patterns on curved surfaces of objects is performed by capturing light from a target symbol over a scan line, generating an electrical analog signal indicative of the captured light over the scan line, digitizing the electrical analog signal into a digitized signal, decoding the digitized signal between the start and stop patterns into valid characters of the target symbol, identifying leading and trailing waveform portions or fragments of the analog signal indicative of the start and stop patterns, matching the identified leading and trailing waveform portions of the analog signal against known analog waveforms of the start and stop patterns of the target symbol, and verifying that a match has occurred when the matching between the leading and trailing waveform portions and the known analog waveforms exceeds a known threshold correlation.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a schematic diagram of a handheld moving laser beam reader for electro-optically reading symbols having symbologies with multi-unit, bar and space element, start and stop patterns that may use, and benefit from, the present invention;

FIG. 2 is a schematic diagram of a handheld imaging reader for electro-optically reading symbols having symbologies with multi-unit, bar and space element, start and stop patterns that may use, and benefit from, the present invention;

DETAILED DESCRIPTION OF THE PREFERRED EMBODIMENTS

Figure 3:
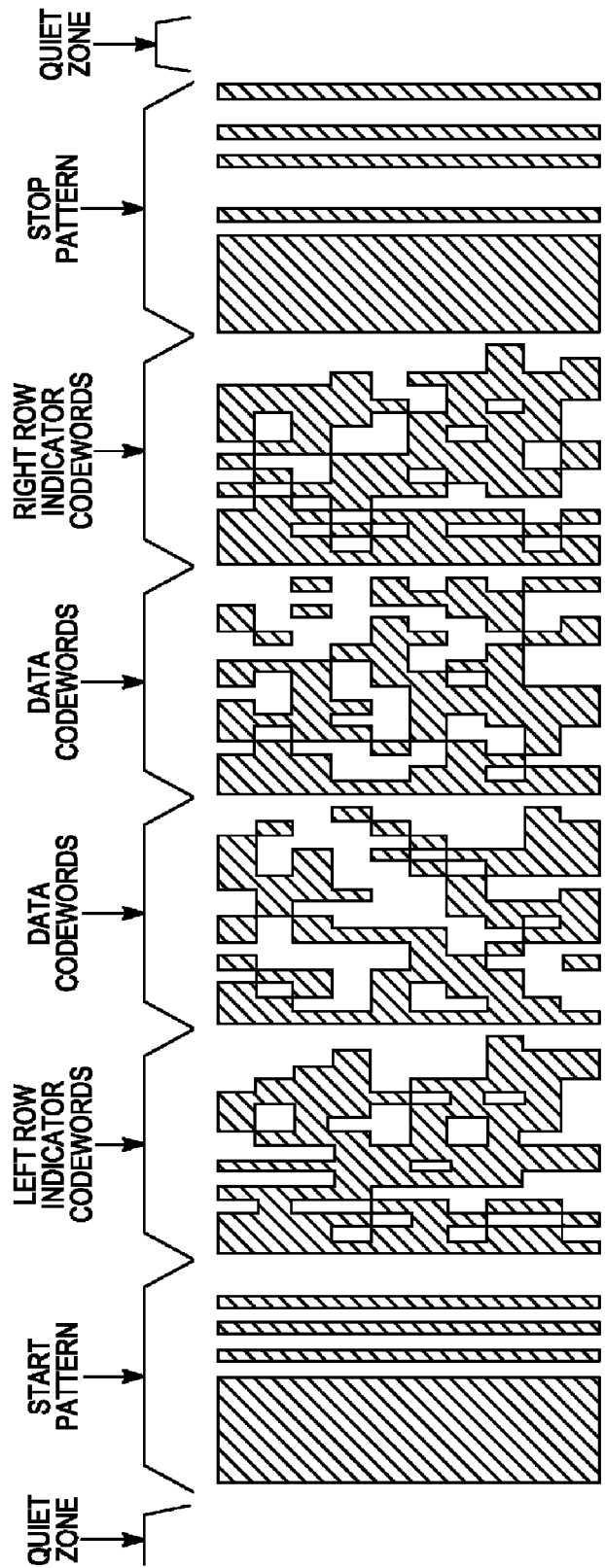
FIG. 3 is a view of a PDF417 symbol depicting its structure.

FIG. 1 depicts a moving laser beam reader 40 for electro-optically reading target symbols having different symbologies, as described above, that may use, and benefit from, the present invention. The beam reader 40 includes a scanner 62 in a handheld housing 42 having a handle 44 on which a trigger 10 for initiating reading is mounted. The scanner 62 is operative for scanning an outgoing laser beam from a laser 64 and/or a field of view of a light detector or photodiode 66 in a scan pattern, typically comprised of a scan line (see FIG. 4), multiple times per second, for example, forty times per second, through a window 46 across the symbol for reflection or scattering therefrom as return light detected by the photodiode 66 during reading. The beam reader 40 also includes a focusing lens assembly or optics 61 for optically modifying the outgoing laser beam to have a large depth of field, and a digitizer 68 for converting an electrical analog signal 12 (see FIG. 5) generated by the detector 66 from the return light into a digitized signal 14 (see FIG. 5) for subsequent decoding by a microprocessor or controller 70 into data indicative of the symbol being read.

FIG. 2 depicts an imaging reader 50 for imaging target symbols of different symbologies to be electro-optically read, as described above, which may also use, and benefit from, the present invention. The imaging reader 50 includes a one- or two-dimensional, solid-state imager 30, preferably a CCD or a CMOS array, mounted in the handheld housing 42 having the handle 44 on which the trigger 10 for initiating reading is mounted. The imager 30 has an array of image sensors operative, together with an imaging lens assembly 31, for capturing return light reflected and/or scattered from the target symbol through the window 46 during the imaging to produce the electrical analog signal 12 (see FIG. 5) indicative of a captured image for subsequent digitizing into the digitized signal 14 (see FIG. 5) and decoding by the controller 70 into data indicative of the symbol being read.

When the reader 50 is operated in low light or dark ambient environments, the imaging reader 50 includes an illuminator 32 for illuminating the target during the imaging with illumination light directed from an illumination light source through the window 46. Thus, the return light may be derived from the illumination light and/or ambient light. The illumination light source comprises one or more light emitting diodes (LEDs). An aiming light generator 34 may also be provided for projecting an aiming light pattern or mark on the target prior to imaging.

In operation of the imaging reader 50, the controller 70 sends a command signal to drive the illuminator LEDs 32 for a short time period, say 500 microseconds or less, and energizes the imager 30 during an exposure time period of a frame to collect light from the target symbol during said time period. The controller 70 maps a virtual scan line (see FIG. 4) over the symbol by specifying end point coordinates, or one of the end point coordinates and a slope of the virtual scan line. The controller 70 energizes all the sensors in the imager 30 that lie in a line between these end point coordinates. The virtual scan line need not be horizontal. A typical array needs about 16-33 milliseconds to read the entire target symbol image along the scan line and operates at a frame rate of about 30-60 frames per second. The array may have on the order of one million addressable image sensors.

Figure 4:
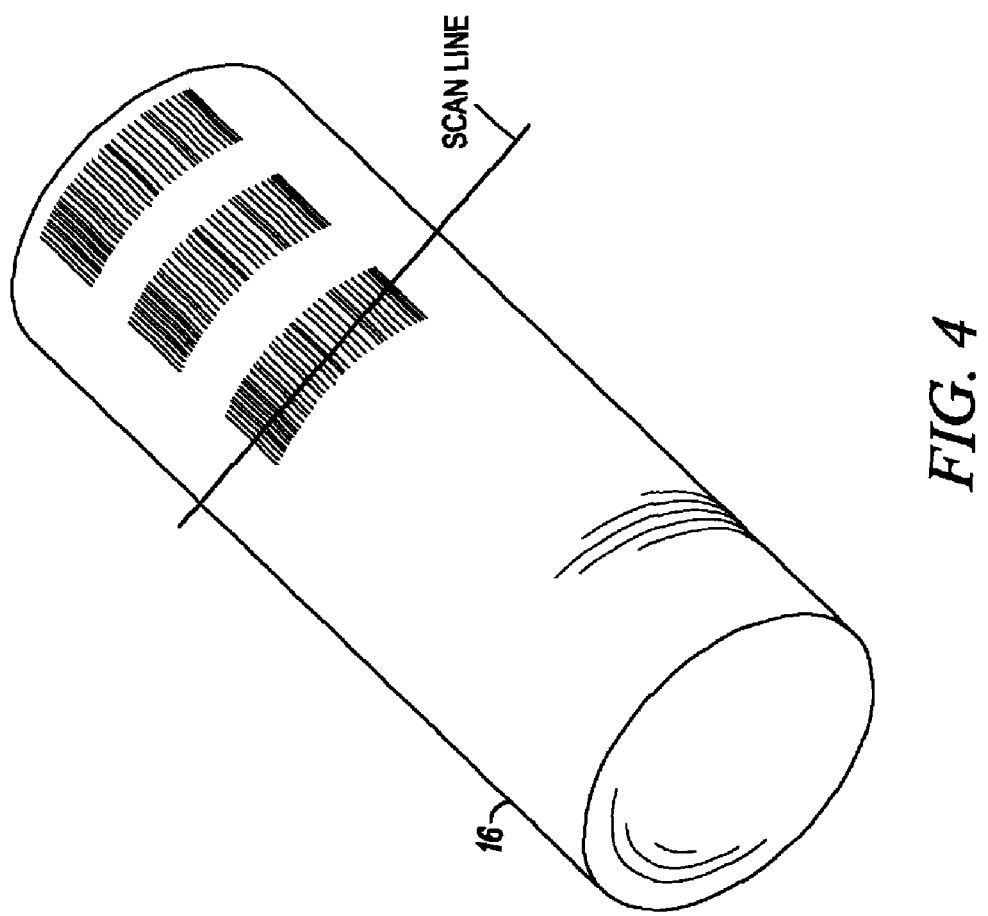
FIG. 4 is a perspective view of a cylindrical shipping tube depicting some Code 128 symbols thereon, as well as a scan line generated from one of the readers of FIG. 1 or 2 extending across one of the Code 128 symbols on the tube.
Figure 5:
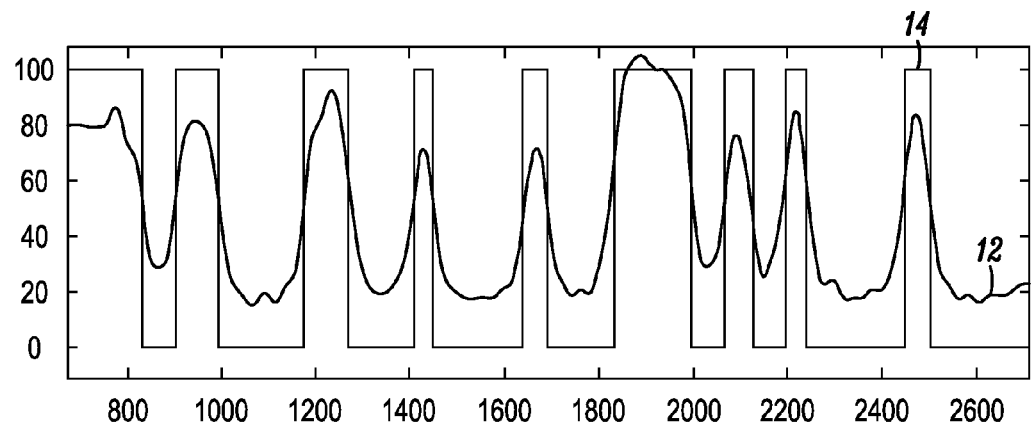
FIG. 5 is a graph of luminance level versus sample number of an analog signal waveform and of a superimposed digitized signal waveform generated from one of the readers of FIG. 1 or 2, both signals representing a target symbol.

FIG. 3 depicts an exemplary symbol, in this case, a PDF417 symbol, whose symbology is characterized by the illustrated multi-unit, bar and space element, start and stop patterns, that may use, and benefit from, the present invention, especially when the symbol is on a curved surface, such as a cylindrical shipping tube 16 (see FIG. 4). The multi-unit start and stop patterns are located at the opposite end regions of the symbol and, as described above, are the most distorted by the curvature of the tube 16, and are therefore the most likely to be subject to reading errors or entirely unreadable.

Figure 6:
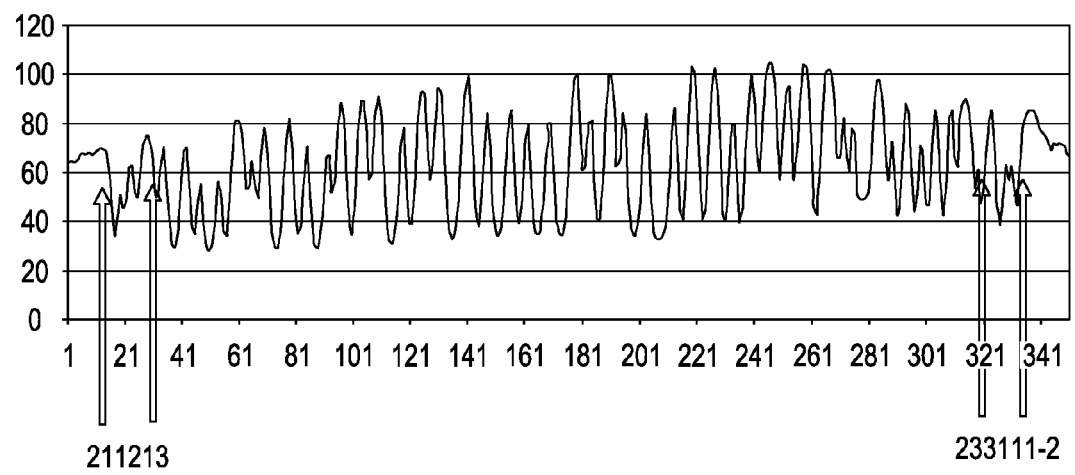
FIG. 6 is a graph of an analog signal waveform generated during reading of the Code 128 symbol of FIG. 4 along the scan line, wherein the arrows depicts boundaries of leading and trailing waveform portions or fragments of the analog signal indicative of start and stop patterns of the target symbol.

The digitizer 68 or the controller 70 is operative for digitizing the electrical analog signal 12 generated by either reader 40 or 50, across the scan line (actual or virtual) into the digitized signal 14. FIG. 6 depicts the waveform of the analog signal generated during reading of the Code 128 symbol of FIG. 4 along the scan line. As described in more detail below in connection with the flow chart of FIG. 7, according to this invention, the controller 70 is operative for decoding the digitized signal between the start and stop patterns into valid characters of the target symbol, for identifying leading and trailing waveform portions or fragments of the analog signal indicative of the start and stop patterns, for matching the identified leading and trailing waveform portions of the analog signal against known analog waveforms of the start and stop patterns of the target symbol, and for verifying that a match has occurred when the matching between the leading and trailing waveform portions and the known analog waveforms exceeds a known threshold correlation, e.g., 50 percent.

Figure 7:
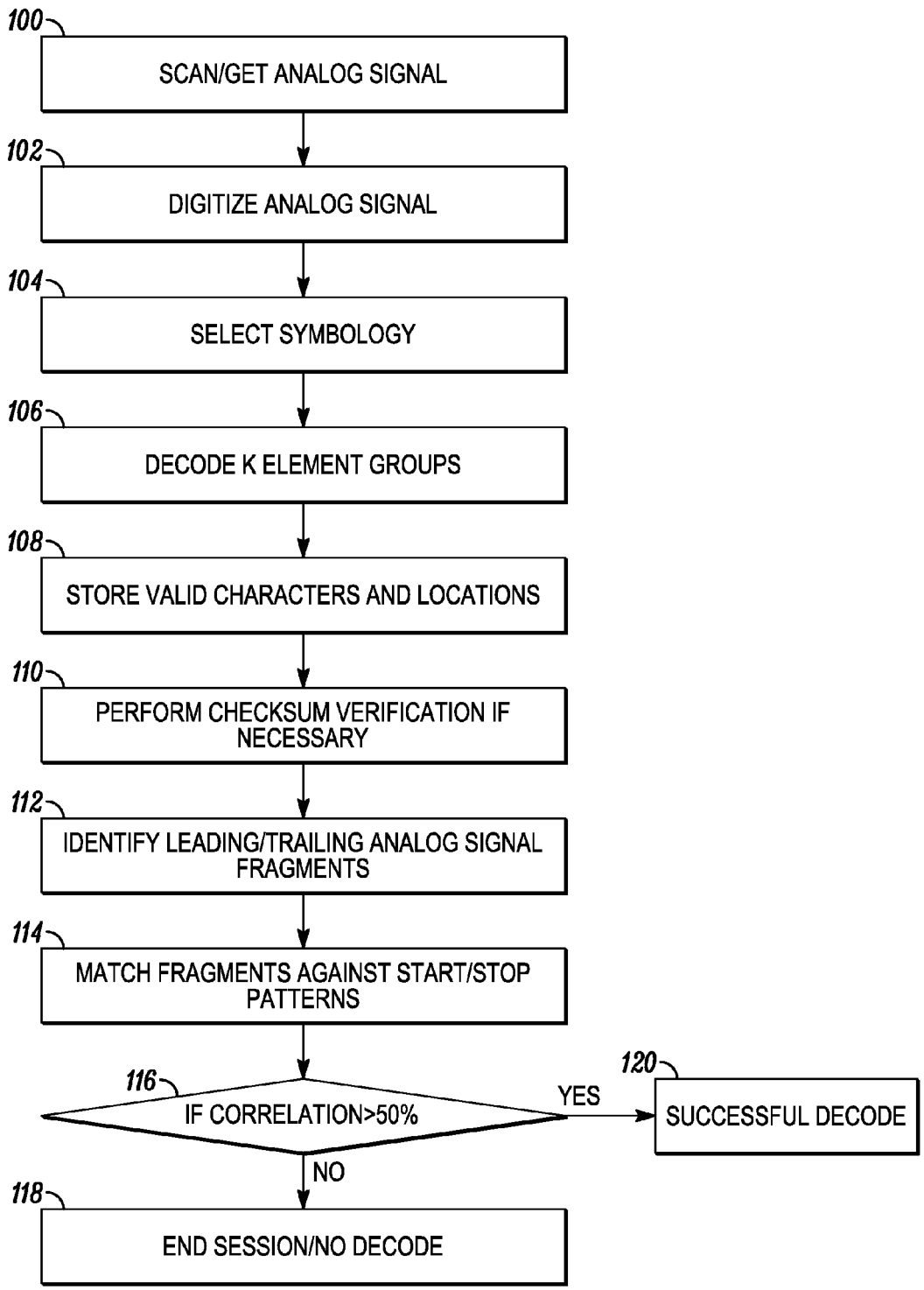
FIG. 7 is a flow chart of steps performed in accordance with the method of the present invention.

Hence, with the aid of the flow chart of FIG. 7, the programmed microprocessor or controller 70 is operative, in block 100, for getting a scan across the scan line (actual or virtual) to obtain the electrical analog signal 12 derived from the target symbol (e.g., see FIG. 3). In block 102, the digitizer 68 or the controller 70 associated with the imager 30 is operative for digitizing the electrical analog signal 12 into the digitized signal 14, also known as the digital bar pattern (DBP). As described above, when the symbol is on a curved surface, the DBP will not correctly represent the beginning and end portions of the symbol, i.e., the start and start patterns, where the bar and space elements might be merged together, or missed altogether, due to curvature distortion.

In accordance with this invention, the controller 70 initially selects the symbology in block 104. Thus, the controller will sequentially check whether the DBP is characteristic of Code 128, Code 39, Code 93, or PDF417, etc. in a desired order. Once the symbology of the symbol is identified, the controller 70, in block 106, successively processes groups of k elements of the DBP, where k equals the number of bar and space elements in a single valid character of the determined symbology, and where the groups are separated by two bar and space elements. For example, in the case of a Code 128 symbol where three bars and three spaces comprise each character, then k=6. The controller examines the first six elements to see if they represent a valid character. If not, then the controller skips two elements (one bar and one space), and then examines the next six elements to see if they represent a valid character. If not, then the controller again skips the next two elements, and again examines if they represent a valid character. This process continues until no more elements remain, at which time, all the valid characters are stored as a partial string, and their locations (indices) are also stored, in block 108, in a memory accessible by the controller.

At this point, the controller assumes that the partial string represents a correct bar code symbol without the start and stop patterns, and performs a checksum verification if necessary at block 110. For some symbologies, the start and stop patterns are fixed and only act as bar code symbol delimiters; hence, it is unnecessary to decode the start and stop patterns for such symbols. For other symbologies, like Code 128, a checksum verification is necessary and is complicated by the fact that the start pattern has three variants, i.e., start code A, start code B, and start code C, and the actual variant affects the value of the checksum. In that case, the controller sequentially evaluates which variant is being employed in the target symbol by checking which variant is needed for the checksum verification to pass, and then stores that information.

Next, the controller identifies, at block 112, the bar and space elements within the analog signal that might represent the start and stop patterns. For example, the start pattern would start from a leading margin on the left side of the analog signal in FIG. 6 and would end before the first DBP element of the first validly decoded character. A pair of arrows on the left side of FIG. 6 denotes this leading portion or fragment of the analog signal that represents the start pattern. The designation "211213" denotes a first bar element of two units, a second space element of one unit, a third bar element of one unit, a fourth space element of two units, a fifth bar element of one unit, and a sixth space element of three units.

Analogously, the stop pattern would begin after the last DBP element of the last validly decoded character and would end at the trailing margin on the right side of the analog signal in FIG. 6. A pair of arrows on the right side of FIG. 6 denotes this trailing portion or fragment of the analog signal that represents the stop pattern. The designation "233111-2" denotes a first bar element of two units, a second space element of three units, a third bar element of three units, a fourth space element of one unit, a fifth bar element of one unit, a sixth space element of one unit, and a seventh bar element of two units (Code 128 has an additional extra bar in its stop pattern).

Next, the controller identifies, at block 114, whether the leading and the trailing waveform fragments, respectively representing the start and stop patterns, match known analog waveforms of the start and stop patterns of the target symbol (and its variant). Since the exact degree of the curvature is not known, then the magnitude of the distortion caused by the curvature is not known either. Therefore, matching the leading and the trailing waveform fragments representing the start and stop patterns against ideal, non-distorted, prototype waveforms would fail. As a result, an approximate pattern matching technique is preferably employed. In a preferred embodiment, each distorted start and stop pattern is modeled as a sequence of distinctive signal features, e.g., peaks and valleys and their relative positions, that can still be detected when the resolution is very low. Each such sequence of signal features is correlated with a corresponding equivalent set of features extracted from the respective analog signal fragment, and a degree of similarity or correlation is evaluated. An example of a method that allows this type of approximate pattern matching is the K-Nearest Neighbor method or the Hidden Markov Model method.

If each pattern match or correlation exceeds a threshold, e.g., 50%, at decision block 116, then that pattern is accepted as representing the start and stop pattern, and the controller determines that a successful decode has occurred at block 120. If the threshold is not met, then the controller determines that no decode has occurred at block 118, and the session terminates. Since the scan or decoding direction (forward or reverse) is known at that moment, it is also known whether the left fragment has to be matched to a start pattern, or whether the right fragment has to be matched to a stop pattern.

It will be understood that each of the elements described above, or two or more together, also may find a useful application in other types of constructions differing from the types described above.

While the invention has been illustrated and described as embodied in electro-optical readers for reading symbols on curved surfaces, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An arrangement for electro-optically reading symbols having symbologies with multi-unit, bar and space element, start and stop patterns on curved surfaces of objects, comprising:
    a data capture assembly for capturing light from a target symbol over a scan line, and for generating an electrical analog signal indicative of the captured light over the scan line; and
    a controller for digitizing the electrical analog signal into a digitized signal, for decoding the digitized signal between the start and stop patterns into valid characters of the target symbol, for identifying leading and trailing waveform portions of the analog signal indicative of the start and stop patterns, for matching the identified leading and trailing waveform portions of the analog signal against known analog waveforms of the start and stop patterns of the target symbol, and for verifying that a match has occurred when the matching between the leading and trailing waveform portions and the known analog waveforms exceeds a known threshold correlation.

2. The arrangement of claim 1, wherein the data capture assembly includes a laser for emitting a laser beam, a scanner for sweeping the laser beam along the scan line across the target symbol for reflection and scattering therefrom, and a detector for detecting the captured light from the target symbol.

3. The arrangement of claim 1, wherein the data capture assembly includes a solid-state imager having an array of sensors for detecting the captured light along the scan line from the target symbol.

4. The arrangement of claim 1, wherein the controller is operative for determining the symbology of the target symbol from the digitized signal.

5. The arrangement of claim 4, wherein the controller is operative for decoding the digitized signal of a determined symbology by successively processing groups of k elements of the digitized signal, where k equals the number of bar and space elements in a single valid character of the determined symbology, and where the groups are separated by two bar and space elements.

6. The arrangement of claim 5, wherein the controller is operative for checking whether the successively processed groups are valid characters of the determined symbology without the start and stop patterns.

7. The arrangement of claim 1, wherein the controller is operative for verifying that the match occurred when the threshold correlation exceeds 50 percent.

8. An arrangement for electro-optically reading symbols applied on curved surfaces of cylindrical objects, the symbols having symbologies with spaced-apart start and stop patterns comprised of multiple bar and space elements, each element having multiple unit widths, the arrangement comprising:
    a data capture assembly for capturing light from a target symbol over a scan line, and for generating an electrical analog signal indicative of the captured light over the scan line; and
    a controller for digitizing the electrical analog signal into a digitized signal, for decoding the digitized signal between the start and stop patterns into valid characters of the target symbol, for identifying leading and trailing waveform portions of the analog signal indicative of the start and stop patterns, for matching the identified leading and trailing waveform portions of the analog signal against known analog waveforms of the start and stop patterns of the target symbol, and for verifying that a match has occurred when the matching between the leading and trailing waveform portions and the known analog waveforms exceeds a known threshold correlation.

9. A method of electro-optically reading symbols having symbologies with multi-unit, bar and space element, start and stop patterns on curved surfaces of objects, comprising the steps of:
    capturing light from a target symbol over a scan line, and generating an electrical analog signal indicative of the captured light over the scan line; and
    digitizing the electrical analog signal into a digitized signal, decoding the digitized signal between the start and stop patterns into valid characters of the target symbol, identifying leading and trailing waveform portions of the analog signal indicative of the start and stop patterns, matching the identified leading and trailing waveform portions of the analog signal against known analog waveforms of the start and stop patterns of the target symbol, and verifying that a match has occurred when the matching between the leading and trailing waveform portions and the known analog waveforms exceeds a known threshold correlation.

10. The method of claim 9, wherein the capturing step is performed by emitting a laser beam, sweeping the laser beam along the scan line across the target symbol for reflection and scattering therefrom, and detecting the captured light from the target symbol.

11. The method of claim 9, wherein the capturing step is performed by exposing an array of sensors of a solid-state imager to detect the captured light along the scan line from the target symbol.

12. The method of claim 9, and determining the symbology of the target symbol from the digitized signal.

13. The method of claim 9, wherein the decoding step is performed by decoding the digitized signal of a determined symbology by successively processing groups of k elements of the digitized signal, where k equals the number of bar and space elements in a single valid character of the determined symbology, and where the groups are separated by two bar and space elements.

14. The method of claim 13, and checking whether the successively processed groups are valid characters of the determined symbology without the start and stop patterns.

15. The method of claim 9, wherein the verifying step is performed by verifying that the match occurred when the threshold correlation exceeds 50 percent.

* * * * *